United States Patent [19]
Barrett et al.

[11] Patent Number: 6,029,144
[45] Date of Patent: Feb. 22, 2000

[54] COMPLIANCE-TO-POLICY DETECTION METHOD AND SYSTEM

[75] Inventors: Merwin John Barrett, Newark Valley; Stanley Philip Cason, Johnson City; Karen Marie D'Andria, Vestal; Michael Wayne Gearing, Endicott, all of N.Y.; Keith Ky Trieu Ho, Austin, Tex.; Hope Eleanor Miller, Endicott; Rosemary DeSantis Paradis, Vestal, both of N.Y.; Eric Woisard, Ridgefield, Conn.

[73] Assignee: International Business Machines Corporation, Armonk, N.Y.

[21] Appl. No.: 08/920,553

[22] Filed: Aug. 29, 1997

[51] Int. Cl.[7] .................................................. G06F 17/60
[52] U.S. Cl. .............................. 705/30; 235/375; 235/437
[58] Field of Search .................................. 705/1, 10, 11, 705/22, 28, 30; 235/375, 437; 707/101

[56] References Cited

U.S. PATENT DOCUMENTS

| | | | |
|---|---|---|---|
| 4,700,297 | 10/1987 | Hagel, Sr. et al. | 705/30 |
| 4,817,092 | 3/1989 | Denny | 371/11 |
| 4,852,000 | 7/1989 | Webb et al. | 705/30 |
| 4,873,687 | 10/1989 | Breu | 371/8.2 |
| 5,278,901 | 1/1994 | Shieh et al. | 380/4 |
| 5,355,474 | 10/1994 | Thuraisngham et al. | 395/600 |
| 5,557,742 | 9/1996 | Smaha et al. | 395/186 |
| 5,570,283 | 10/1996 | Shoolery et al. | 705/5 |
| 5,621,889 | 4/1997 | Lermuzeaux et al. | 704/273 |
| 5,845,285 | 12/1998 | Klein | 707/101 |

*Primary Examiner*—Eric W. Stamber
*Assistant Examiner*—Hani M. Kazimi
*Attorney, Agent, or Firm*—Schmeiser, Olsen & Watts; Arthur J. Samodovitz

[57] ABSTRACT

According to the present invention, a system and method for checking expense entries for compliance with policy rules and detecting the possibility of fraud is provided. The preferred embodiment includes a policy checker comprising a knowledge based system designed to determine expense entries' compliance with policy rules and detect a possibility of fraud. The preferred embodiment also includes an auditor workflow system that works with the policy checker to guide manual audits of those expense entries that are not in compliance with the policy rules. The preferred embodiment also includes a data pattern analyzer that detects patterns of behavior that can be indicative of fraud. The preferred embodiment also includes a prioritizer for ranking detected policy violations. These systems work together to provide an automated system for checking expense entries for compliance with company rules, detecting instances where fraud is likely, and generating the appropriate reports.

58 Claims, 11 Drawing Sheets

COMPLIANCE-TO-POLICY DETECTION METHOD AND SYSTEM

BACKGROUND OF THE INVENTION

1. Technical Field

The present invention relates in general to auditing systems. More specifically, the present invention relates to automated employee expense reimbursement auditing.

2. Background Art

One of the most difficult tasks that companies have to face is the management of expense reimbursement to employees. This task is particularly difficult with large companies that can have thousands of employees, each of which can submit several requests for reimbursement on any given day.

Of particular concern is employee expense reimbursement fraud. This type of fraud can be manifest in many different ways. For example, employees may simply submit requests for reimbursement of expenses that did not actually occur. In some cases the expense could be legitimate, but the dollar amount requested could be inflated. In some cases the request could be for reimbursement for expenses that are not reimbursable according to company policy. In these and many other cases the employee, by requesting an improper amount of reimbursement is attempting to defraud his employer.

In other cases, the requests may be for legitimate expenses but could contain violations of company policy. For example, an employee could request reimbursement for a car rental where the rental actually occurred, but the employee violated company policy in the car rental by choosing a non-preferred rental company. In these cases a company may still reimburse the employee, but will want to be able to inform the employee of the violation and track employees that consistently violate company rules.

In an attempt to combat this type of fraudulent behavior and locate instances of company policy violations, many companies have instituted auditing procedures for employee expense entry reimbursements. This typically involves selecting a few requests for reimbursements and having human auditors preform a manual audit of the request. Unfortunately, this is a labor intensive process. As a result, most companies only have the ability to audit a small portion of the reimbursement requests that are made. Thus, most are paid without every being examined for the likelihood of fraud, or for compliance with company rules. This results in a relatively small portion of fraud and policy violations being detected.

Additionally, because of the length of time needed for an expense request to be processed through the system and manually audited, many companies must pay the expense entry before the audit is performed. Thus, even when an audit locates problems it may be too late to easily make the appropriate corrections to the expense request.

Without a method and apparatus to provide automated employee expense account auditing, companies will be unable to effectively audit expense account information to detect the possibility of fraud and compliance with company rules.

DISCLOSURE OF INVENTION

According to the present invention, a system and method for checking expense entries for compliance with policy rules and detecting the possibility of fraud is provided. The preferred embodiment includes a policy checker comprising a knowledge based system designed to determine expense entries' compliance with policy rules and detect a possibility of fraud. The preferred embodiment also includes an auditor workflow system that works with the policy checker to guide manual audits of those expense entries that are not in compliance with the policy rules. The preferred embodiment also includes a data pattern analyzer that detects patterns of behavior that can be indicative of fraud. The preferred embodiment also includes a prioritizer for ranking detected policy violations. These systems work together to provide an automated system for checking expense entries for compliance with company rules, detecting instances where fraud is likely, and generating the appropriate reports.

Thus, it is an advantage of the present invention to provide a system that is capable of auditing all expense entries submitted. It is an additional advantage to provide a system for auditing the expense entries before payment is made without requiring an excessive delay in payment. It is an additional advantage to provide a mechanism for recognizing patterns of noncompliance that would be difficult for human auditors to detect.

DETAILED DESCRIPTION

The preferred embodiment provides a system and method and apparatus for automated auditing of expense account entries. The preferred embodiment automatically evaluates requests for expense reimbursement to determine if they comply with the expense account rules. Requests that fail the test are automatically routed to auditors for manual verification. The system also provides mechanisms for generating reports detailing the patterns of expense usage.

Figure 1:
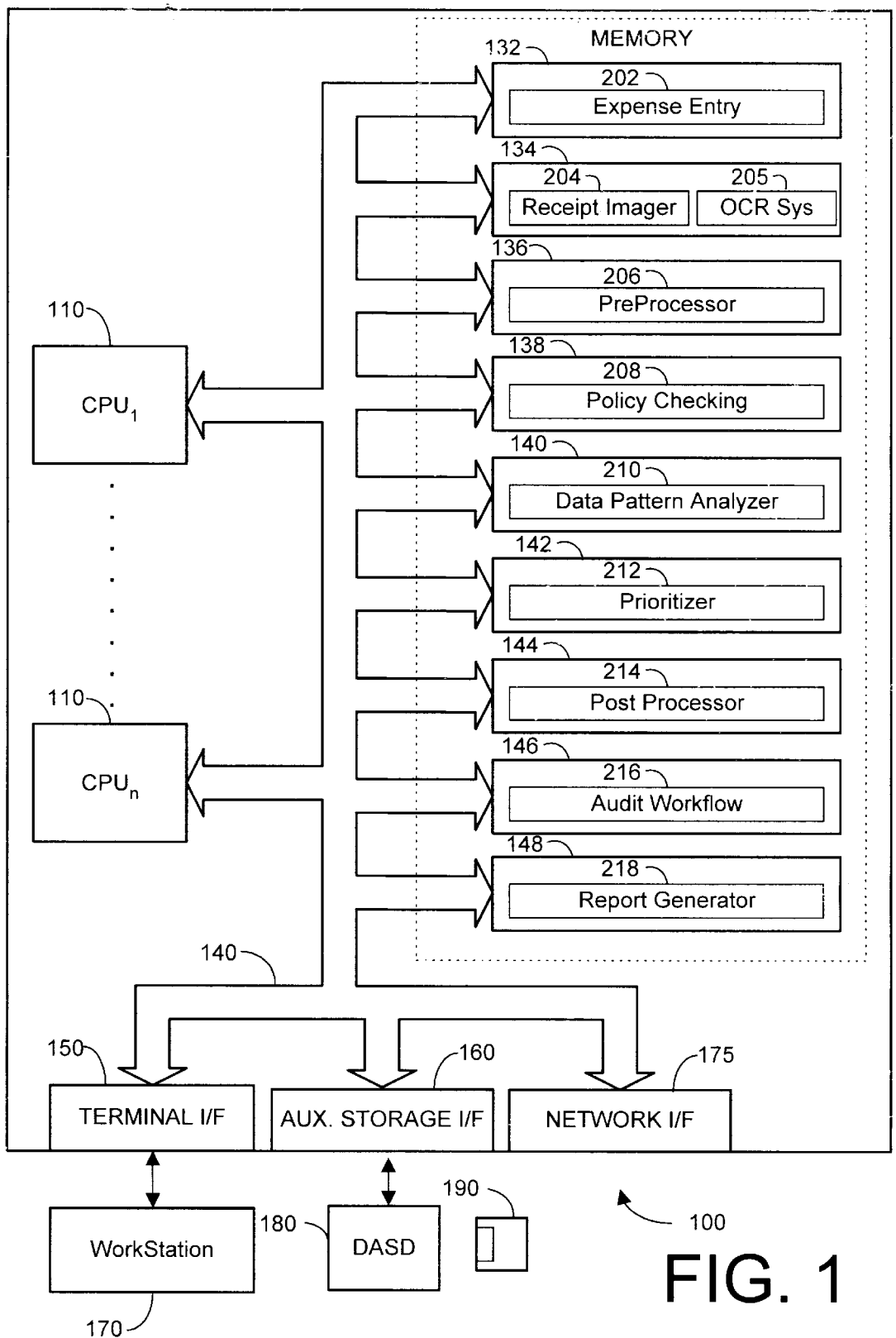
FIG. 1 is a schematic view of an auditing system in accordance with the preferred embodiment.

Referring now to FIG. 1, a computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In the preferred embodiment, the memory 130 includes an expense entry application 202 running in location 132, a receipt imaging application 204 and OCR system 205 running in location 134, a PreProcessor application 206 running in location 136, a policy checking application 208 running in location 138, a data pattern analyzer application 210 running in location 140, a prioritizer application 212 running in location 142, a post processor application 214 running in location 144, an audit workflow application 216 running in location 146, and a report generator application 218 running in location 148.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This includes Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computers that collectively comprise system 100. For example, expense entry application 132 may reside on one computer with $CPU_1$, receipt imager application 204 and OCR system 205 may reside on another computer system with a separate $CPU_2$, audit workflow application 216 may reside on third computer system with a separate $CPU_3$, report generator application 218 may reside on fourth computer system with a different $CPU_{n-1}$, and preprocessor application 206, policy checking application 208, data pattern analyzer application 210, prioritizer application 212, and post processor application 214 may all reside on a fifth computer system with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM PS/2 personal computer, RS/6000 or an AS-400 computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk 190. DASD 180 may also be any other type of DASDs known to those skilled in the art. This would include CD-ROM drives, hard disk drives, optical drives, etc.

Network interface 175 is used to connect other computer systems and/or workstations to computer system 100 in networked fashion. The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Figure 2:
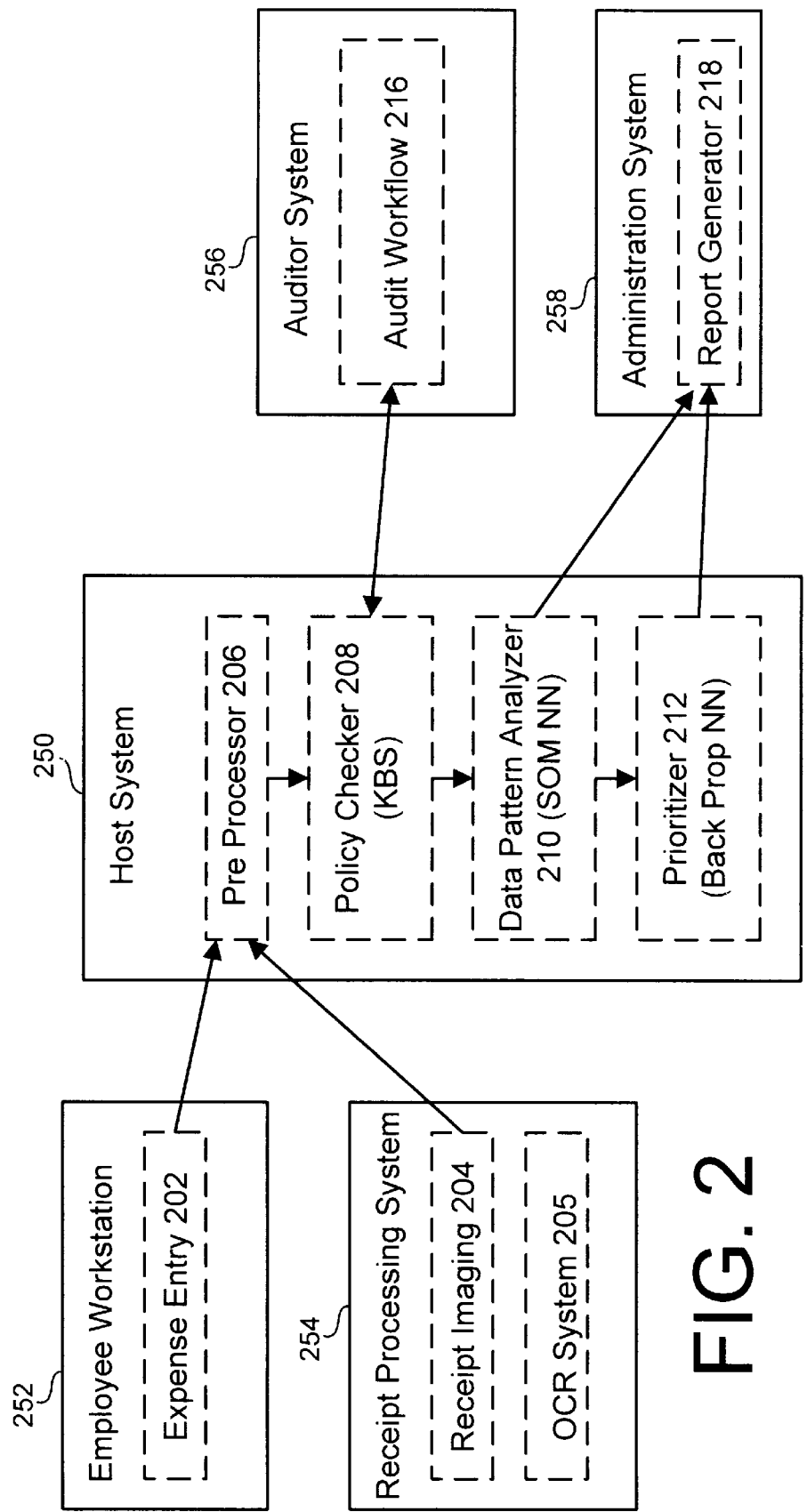
FIG. 2 is a schematic view of an auditing system in accordance with the preferred embodiment showing process flows.

Referring now to FIG. 2, computer system 100 is illustrated as functional blocks to better illustrate the preferred embodiment of the present invention. The computer system 100 is divided up into four main systems, a host system 250, an employee system 252, a receipt processing system 254, an auditor system 256 and an administration system 258.

The host system 250 includes PreProcessor 206, Policy Checking application 208, Data Pattern Analyzer application 210 and Prioritizer application 212. These applications work together to evaluate expense entries for compliance to policy rules, detect patterns of usage, and prioritize the information. The host system works with the employee system 252, the receipt processing system 254, the auditor system 256 and the administration system 258 to complete these tasks.

The employee system 252 includes the expense entry application 202. Preferably, the employee system 254 includes an expense entry application 202 on the workstation of each employee. This allows each employee to easily submit requests for expense reimbursements, called an "expense entry."

The receipt processing system 254 includes a receipt imaging application 204 and an optical character recognition (OCR) system 205. The receipt processing system 254 receives receipts that are submitted in conjunction with expense entries, images the receipts using receipt imaging application 204 and then processes the receipts images through OCR system 205. Additionally, the receipt processing system 254 preferably receives electronic receipts supplied by the credit card companies that can be used to verify charged expenses. The auditor system 256 includes an audit workflow system 216 to assign and auditors to manually verify expense entries when needed. The administration system 258 includes a report generator 218 which creates reports for management use from the data.

Figure 3:
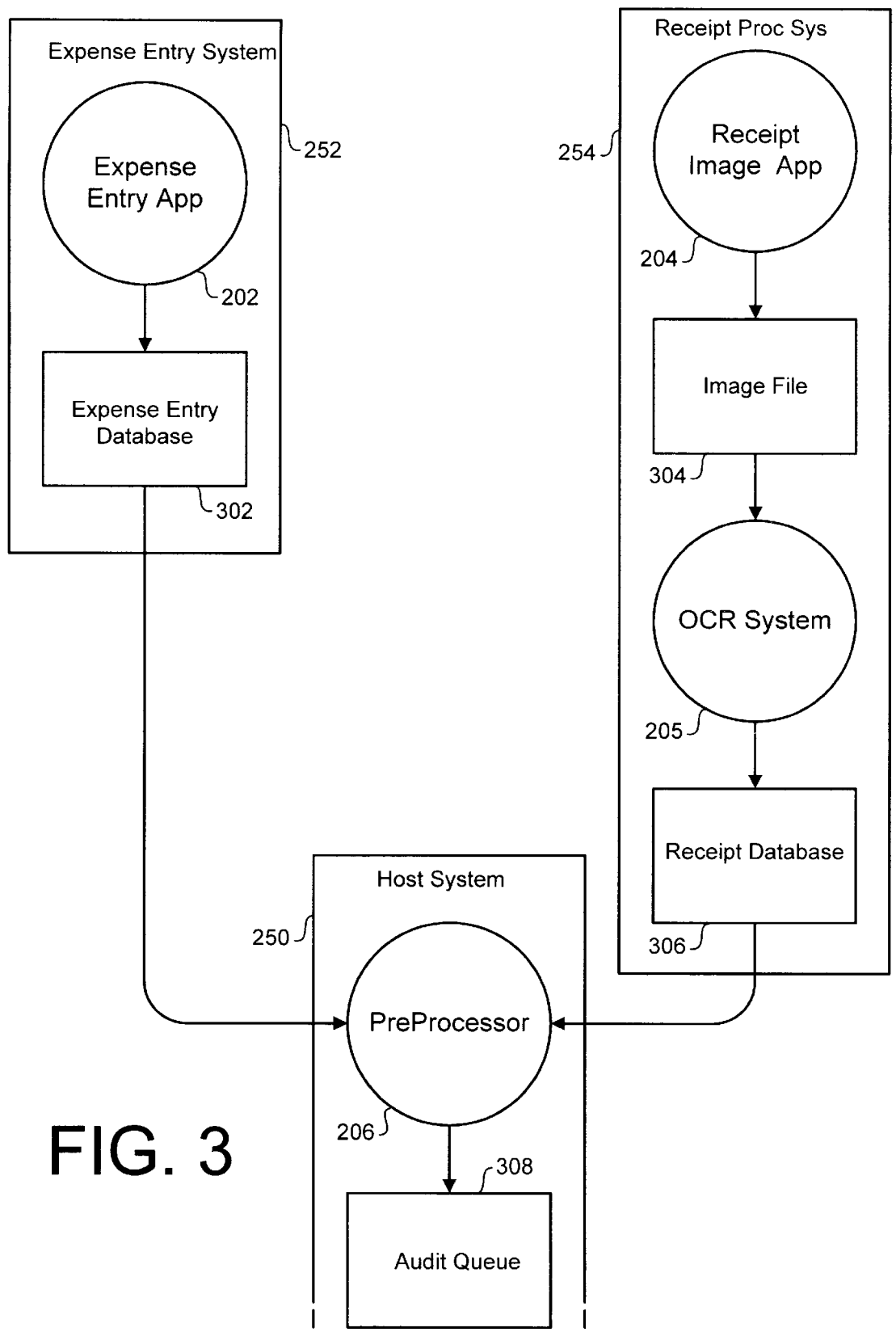
FIG. 3 is a data flow diagram of an expense entry system and a receipt processing system in accordance with the preferred embodiment.

Turning now to FIG. 3, the process diagram from the expense entry system 252 and the receipt processing system 254 is illustrated. Preferably, the expense entry system 252 includes an expense entry application 202 on the workstation of each employee. This allows each employee to easily submit requests for expense reimbursements, called an "expense entry." The employee system 252 then delivers the expense entry to an expense entry database 302. In the preferred embodiment, the expense entry is first routed to the appropriate manager for approval, and once approved, is routed to the expense entry database 302.

The receipt processing system 254 includes a receipt imaging application 204 and an OCR system 205. The receipt processing system 254 receives receipts that are submitted in conjunction with expense entries and images the receipts with imaging system 204. The receipt processing system 254 then processes the receipts through the OCR system 205.

In the preferred embodiment, the receipts are faxed along with a summary page to a receipt imaging center. Additionally, the actually receipt is sent and stored in a document library where it can be retrieved if necessary. At the receipt imaging center, the fax is received into a workstation with the imaging application 204. Preferably, the imaging application 204 comprises a fax software such as FaxRouter/2 that creates an image file 304 of the receipt. The image file 304 can then be sent to the OCR system 205.

The OCR system 205 is designed to locate and read the pertinent character strings on typical receipts that are most likely to be submitted by an employee. For example, the preferred embodiment OCR system 205 is designed to locate the service and/or item provided, the receipt amount, credit card number used, and the data. Additionally, the OCR system 205 is designed to locate other data fields depending on the type of receipt For example, the OCR system 205 is preferably designed to locate ticket numbers, dates of travel, carrier, routing and name of person traveling from air ticket receipts. Likewise, the OCR system 205 is preferably designed to locate the name of the person renting the room, the dates, and individual items charged to the room in hotel receipts.

The OCR system 205 takes the receipt image, breaks it into text line by line, and then parses the receipt to read the individual components of the line. For some receipts that have a fairly standard form, such as airline receipts, the OCR systems reads the data from the entire form and then fills in the variables that are assigned to various fields. Other fields, such as hotel receipts, follow no standard form and must be read line by line. The OCR system saves the data read from the submitted receipts and summary pages into a receipt database 306.

The expense entry system 252 has thus created an expense entry database 302 containing the submitted expense entries while the receipt processing system 254 has created a receipt database 306 with the data from the corresponding receipts. These databases will be accessed by the PreProcessor 206 to prepare for processing. In particular, PreProcessor 206 selects which expense entries are to be audited, makes a copy of those portions of the expense entry database 302 and prepares it for processing. PreProcessor 206 also makes a copy of the corresponding receipts data from the receipt database 304. Preferably, the PreProcessor 206 selects expense entries for auditing as soon as all the data, such as the receipt data, is available. PreProcessor 206 outputs an audit queue 308 that includes the expense entry data and the corresponding receipt data for selected expense entries.

The audit queue thus includes all the data necessary for auditing the expense entries. In the preferred embodiment the data for each expense entry includes: the employee serial number, the claim date, the total expense amount, the claim type, and the expense date.

Figure 4:
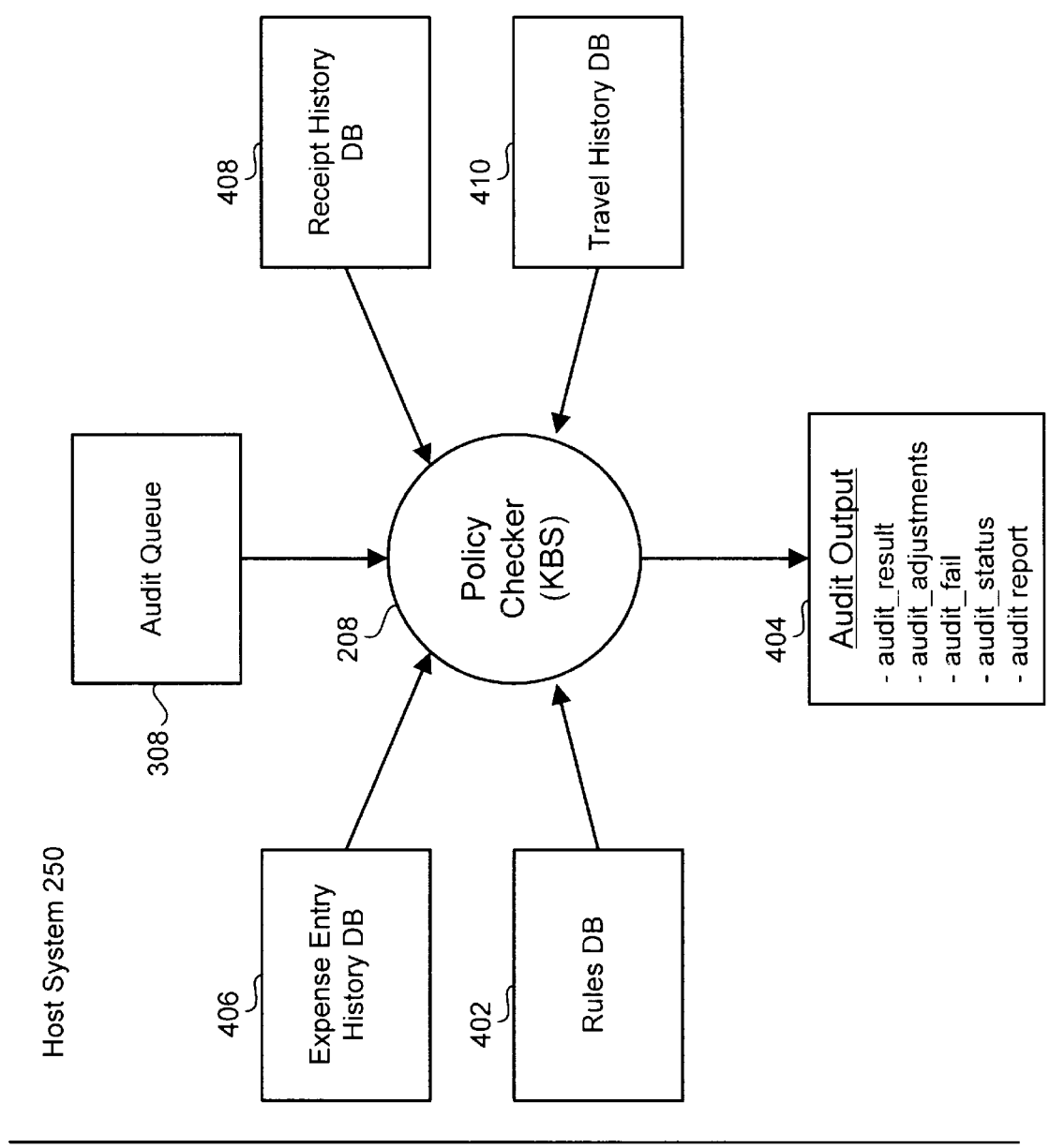
FIG. 4 is a data flow diagram of a policy checker in accordance with the preferred embodiment.

The expense entries in audit queue 308 are first operated upon by Policy checker 208 of FIG. 1. Turning now to FIG. 4, a process diagram illustrating the functionality of Policy checker 208 is illustrated. Policy checker 208 comprises a means for testing the selected expense entries in audit queue 308 for compliance with established policies and rules before reimbursement payment is made.

Policy checker 208 inputs audit queue 308 from PreProcessor 206, an expense entry history database 406, a receipt history database 408, a travel history database 410 and a rules database 402. The expense entry history database 406 preferably includes all previous expenses that the employee charged by expense. The receipt history database 406 preferably includes all the items charged to the corporate charge cards, and in particular the charges for air, for car, for hotel and for miscellaneous expenses. The travel history database 406 preferably includes all records of employee travel that were made through the corporate travel agency. The rules database 402 preferably includes the policy and procedures for expense account reimbursement against which all the expense entries in the audit queue 308 will be tested.

Policy checker provides an audit output 404. Audit output 404 preferably includes an audit_result table, an audit_ adjustments table, an audit_fail table, an audit_status table, and an audit report table. The audit_result table (called a key_mapping table in the appendices) stores the result of the policy checker audit, such as "approve" for expense entries that comply with the rules, and "audit" for those that need verification by human auditors. The audit_adjustments table and audit_fail table keep track of which rules the expense entry fails. The audit_status table records the status of each expense entry in the auditing process, such as whether it is currently being audited by policy checker 208, or whether it has been passed to the auditor system 256 for verification.

In the preferred embodiment, the policy checker comprises a knowledge based system (KBS). Knowledge based systems are systems that act as an expert or advisor in a particular domain or area The knowledge based system includes a set of rules and/or facts that comprise its knowledge base. These facts and rules may include heuristics or rules of thumb for applying those facts and rules.

Policy checker 208 compares expense entries and receipt information stored in audit queue 308 with the users policies and procedures that are stored in rules database 402. If the expense entry complies the audit_result table will be updated to say "Approve" and it will be sent to a reimbursement system for automated payment If the expense entry fails one or more rules the audit_adjustments and audit_fail tables are updated, and then further action will be taken depending on the type of rules which were violated. For example, for some rule violations the claim will be flagged for reporting to management by updating the report table. For some minor rule violations Policy checker 208 will approve the expense entries for payment while sending a rule violation notice to the employee. For other rule violations the claim will be sent to the auditor system 256 along with a recommendation for action to be taken on the failed claim (e.g., reduce the amount of expense on the claim, reject the claim, change a date or other textual information on the claim, etc.). This is done by updating the audit_result table to say "Audit" and updating the audit_status table. At the auditor system 256 a human auditor will be assigned to manually audit and verify the claim according to the recommendations.

The rules in rules database 402 are stored in categories (i.e., Air Travel, Car, Hotel, etc.). The preferred rules used in policy checker 208 are in Appendix 1, with each rule listed with the data sources used and the program used to perform the rules. Violations in some rules require that further rule checking for this category be suspended until compliance with the rule is obtained. General rules are tested first, followed by a testing of the rules in each category in a hierarchal order with a claim being required to pass higher level rules before it will be tested against lower level rules. When a check for a high level rule (e.g., level one rule) fails it is flagged and sent to Auditor System 256 for validation by a human auditor and the other rules in this category are put on hold. If rule compliance is validated by the auditor, notice is sent back to the policy checker 208 where the other rules in the category can be run.

For example, if the car expense amount in an expense entry cannot be verified using the OCR'd image of the receipt in the receipt database, then the other rules in this category cannot be run. The expense entry is then sent to the auditor system 256 to be manually verified. Once manually verified, the Policy checker 208 can continue verifying compliance with the other rules.

In the preferred embodiment where policy checker 208 comprises a knowledge based system the checking of expense entries for compliance with the various rules comprises taking an expense entry from audit queue 308 for checking. Audit queue 308 will include the employee serial number, the claim date, the total expense amount, the claim type, the expense date for each expense entry that is to be checked for rule compliance. The rules in rules DB 402 are grouped into categories of rules (e.g., rule categories for Air Travel, Business Justification, Car, Corporate Credit Card, Exchange Rate, Hotel, Laundry Expenses, Meals, Receipt Verification, Spouse Expenses, Taxable to Employees). The expense entry is checked against each relevant rule in the rules DB 402. For example, each expense entry containing air travel will be checked against the air travel rules and any other relevant rules, and each expense entry containing car rentals will be checked against the car rental rules and any other relevant rules. Some rules, such as business purpose checks, tax rules and spouse rules are checked for every expenses entry.

Additionally, the rules in rules DB 402 are arranged in hierarchal levels, with compliance with some higher level rules being required before other rules in that category can be run. For example, some receipt verification rules (e.g., the receipts for any item over $75.00 required) must be complied before flier checking can be done. Other rules do not require immediate validation and the remaining rules can be checked before any validation is required. Policy checker 208 uses data in expense entry DB 406, receipt history DB 408, travel history DB 410 in its rules checks as necessary.

It should be noted that the rules used by policy checker 208 are preferably designed to reflect current policy in the company. For this reason, the actual programs which are used to implement the rules may change frequently. In order to accommodate this, some rules are implemented as dynamic structured query language (SQL) queries, which can be changed by modifying an Audit_rules table in rules DB 402. Other rules are implemented as programs in the rules DB 402. In either case, all the rules are implemented independently. Thus, the policy checker 408 is able to call each rule independently as necessary to check compliance of an expense entry against that rule. Thus, the policy checker 408 comprises a main routine that calls the rules in rules DB 402 and acts as a knowledge base inference engine.

Figure 5:
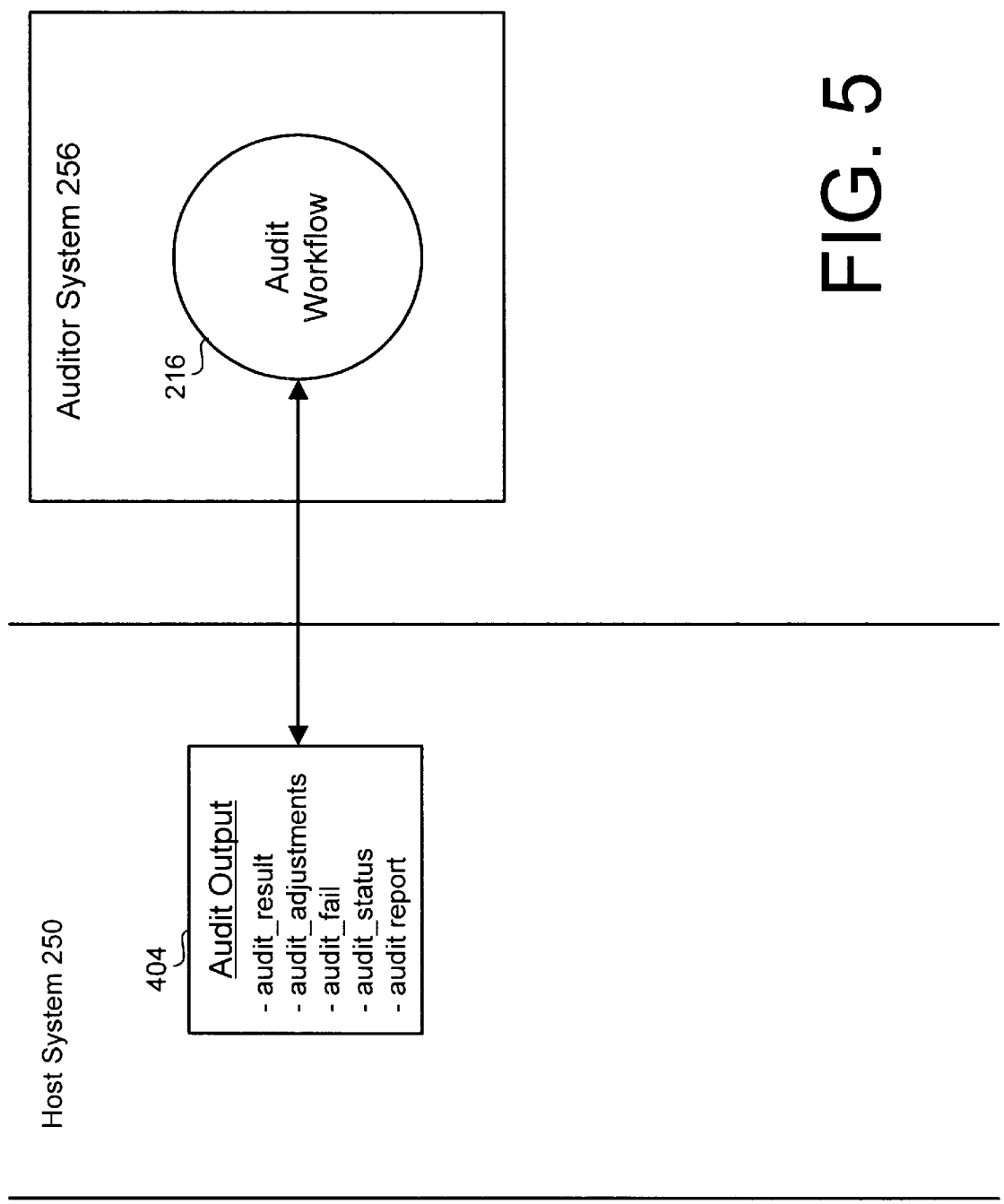
FIG. 5 is a data flow diagram of an auditor system in accordance with the preferred embodiment.

When a expense entry fails a rule it flagged and sent to the auditor system 256 for manual audit and verification. Turning to FIG. 5, a process diagram illustrates the function of auditor system 256. Auditor system 256 works with policy checker 208 to verify significant changes to expense entries that result from the policy checking. In particular, the auditor system 256 receives the expense entries that have failed rules and the changes in the expense entries recommended by policy checker 208 from audit output 404. The auditor system 256 routes this information to auditors who can accept, reject or modify the changes suggested by policy checker 208. The auditor system 256 returns expense entries that need further processing back to policy checker 208 until all rules are either satisfied or corrected by the auditor. The modifications that are made by these rules are saved in the audit_adjustments table.

The auditor system 256 works to provide manual verification of significant changes to the expense entries (e.g., dollar amount changes) that are recommended by policy checker 208 before they are implemented and reimbursement is made. The auditor system 256 preferably includes an audit workflow system 216 designed to track the path of the expense entry through the phases of selection for audit, assignment to an auditor and auditing activities.

In general, workflow systems are a popular process engineering tool that allows a relatively complex project or task to be broken down into a series of smaller processes or tasks. Workflow software uses process language to model the activities and automates transactions where appropriate. Individual tasks are generated into "work lists" (i.e., electronic "to do" lists) and delivered to the appropriate individuals. One popular type of workflow software is Flow-Mark by International Business Machines.

Using workflow software such as FlowMark to implement auditor workflow system 216, the preferred embodiment provides a system that guides the manual audit and verification of the expense entries.

In the preferred embodiment, the auditor workflow system 216 guides the auditors through each claim audit. The workflow system 216 uses the claim information from the audit output (audit_fail and audit_adjustments) and a Flow-Mark business model to pass the policy checker 208 recommendations to a human auditor, and to act upon the auditors actions on these recommendations.

Figure 6:
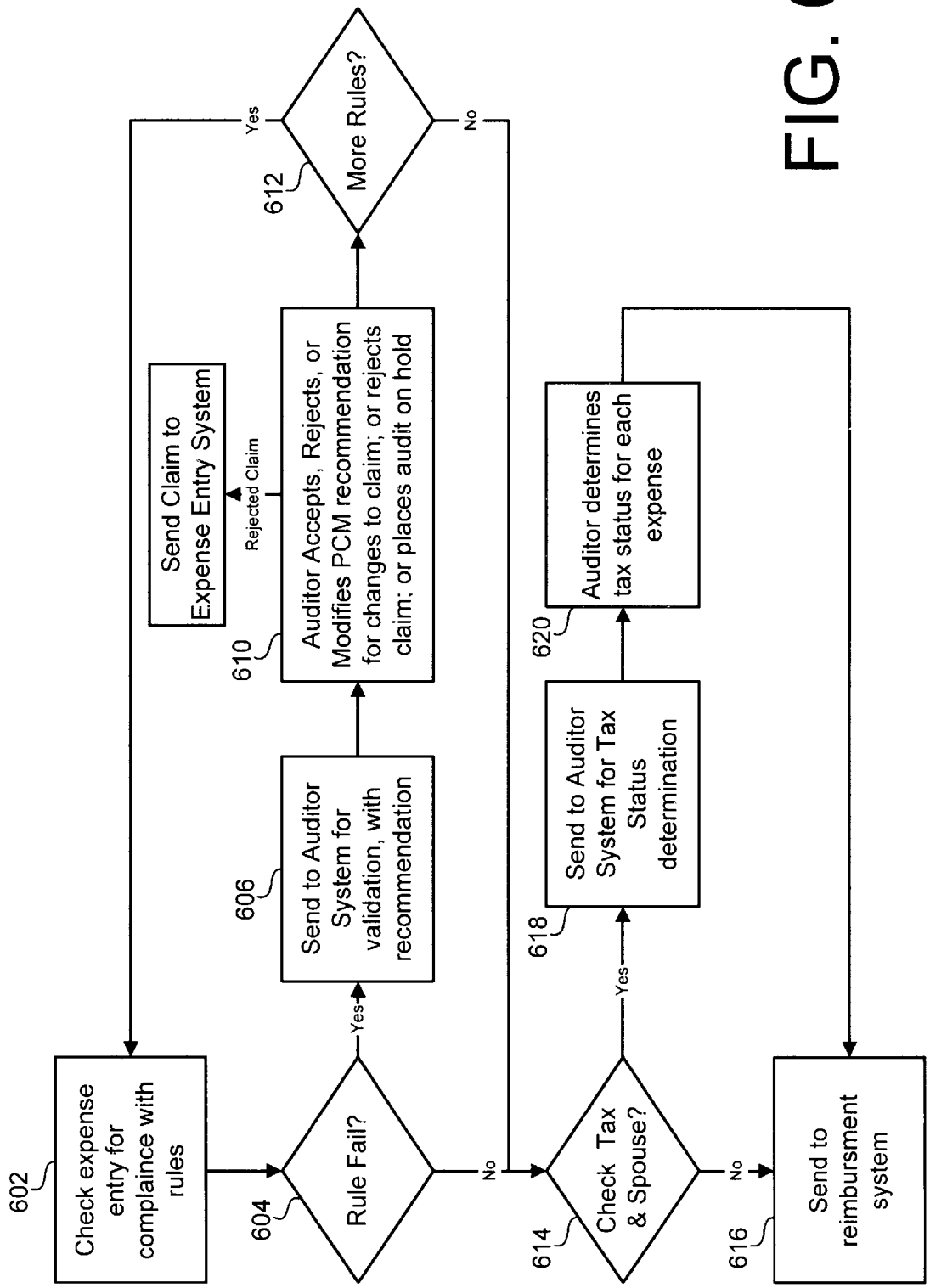
FIG. 6 is a flow diagram illustrating the process flow between the policy checker and the auditor system in accordance with the preferred embodiment.

Turning to FIG. 6, a flow diagram is shown illustrating the process flow of auditor workflow system 216 and its interactions with policy checker 208. The first step 602 is to check an expense entry for compliance with the plurality of policy rules. As stated before this is performed by policy checker 208. When a rule fails that requires auditor validation, decision step 604 directs to step 606, where the policy checker 208 logs the rule violation and sends the expense entry, along with a recommendation for action, to the auditor system 256. It should be noted that in the preferred embodiment, the rules are divided into levels and categories with only some rules requiring validation before other rules can be run. Thus, if a rule requiring immediate validation before other rules can be tested against is violated, the expense entry claim is sent immediately to the auditor system 256. If the rule does not require immediate validation, rule testing continues and the expense entry will be sent to the auditor system 256 when all rules have been run. At the auditor system 256, the expense entry is guided through an validation procedure by audit workflow application 216. Audit workflow application 216 assigns the failed expense entry to a human auditor for audit and validation.

At step 610, the human auditor may either accept, reject or modify the recommendation that was made by policy checker 208. In the alternative, the auditor may reject the expense entry completely, (which would result in the employee not being paid), or place the audit on hold for various reasons. In particular, audit workflow system 216 generates a list of audits that need to be performed, and the auditor can then select any of the expense entries for validation.

When an auditor selects a new to claim to validate, a list of all policy checker recommendations that require manual validation from the audit_fail table will be displayed. The auditor reviews each recommendation and may either accept, reject or modify it. For each recommendation the auditor is shown the original claim information and the changes policy checker 216 recommended. This information is also stored by policy checker 216 in the audit_adjustments table. If the auditor accepts or rejects the recommendation, the audit result field in the audit_fail and audit_adjustments tables will be updated with "accept" or "reject." If the auditor selects the modify option he will be prompted for updates to the recommended dollar amount, date, and/or other changes. These changes are recorded in the audit_adjustments table and the audit result field is updated to "modify" in both the audit_fail and audit_adjustments tables. If any of these actions result in modifications to the expense entry data (i.e., date change, amount change, taxation) a note will be sent to inform the employee, and to the employee's manager if approval is needed.

The auditor may place an expense entry on hold at anytime. There are several reasons why an audit could be placed on hold. For example, additional information may need to be obtained from the employee before an audit can proceed. The auditor may also need to contact a specialist, such as a relocation expense specialist, to ensure that expenses submitted are valid. In these cases the auditor would choose to suspend an audit which would leave the audit activity in a ready to start status. It should also be noted that while an audit is on hold, an auditor can start a new audit of a new expense entry at any time.

If the problems with the expense entry are severe, the auditor can reject the expense entry claim entirely. This will occur where the problems are with the claim are too severe to fix (e.g., if the number of changes may be too large to effectively implement). When a claim is rejected, the auditor workflow system 216 provides a generic letter template for informing the employee of the rejection. In some cases, policy checker 208 will recommend the claim be rejected and can provide a rejection letter template based on the reason for the rejection which the auditor can modify if needed. In either case, a letter is sent to the employee with a copy to the employee's manager. The workflow system sends the notes and then updates the expense entry system 202 to reflect a rejected claim. The document library is also notified so that the original receipt package can be pulled and sent back to the employee.

After the expense entry claim has been reviewed by the auditor, and any changes made are implemented, the expense entry is sent back to policy checker 208 according to decision step 612 if any further rules must be used in step 602. If another rule fails it is sent back to the auditor system where it will again be reviewed by an auditor. This process continues until all the expense entry claim has been tested and cleared against all rules.

When all rules have been checked with any changes for rule violations made, the process moves to decision step 614 where the claim is sent back to the auditor system for tax status determination if tax and spouse checking is required. Tax and spouse checking is required when the employee has indicated that some spouse expenses or other taxable expenses (such as babysitting, additional insurance or other expenses that are not normally reimbursed) are on the expense entry. This is because some expenses, when reimbursed are taxable to the employee. When tax or spouse expenses are indicated, policy checker 208 flags that spouse and tax checking are needed, and sends the expense entry to the auditor system 256.

If no tax and spouse checking is required, the expense entry is then sent to a reimbursement system for employee payment at step 616. If Tax and Spouse checking is required, at step 618 the expense entry is sent to the auditor system 256 where it will be routed to an auditor. The auditor will be shown a list of all claim expenses that the tax and spouse rules determine to be taxable by policy checker 208. The auditor can also check the other expenses from the expense entry claim for taxable expense entries that the rules. The auditor updates the tax code and tax amount for taxable expense at step 620. Once all expenses have a valid tax code, the auditor workflow system 206 sends a note with any comments, as selected by the auditor, to the employee. The audit is then logged and complete and the audit as completed in the audit status database. The expense entry system can then be sent to the reimbursement system at step 616.

In the preferred embodiment, the expense entries are sent to the reimbursement system that runs nightly and identifies all claims with a status of "reject" or "complete." Claims with a status of reject are purged from the appropriate databases. Claims that are complete are also purged and delivered the reimbursement system with a status of "pay."

Figure 7:
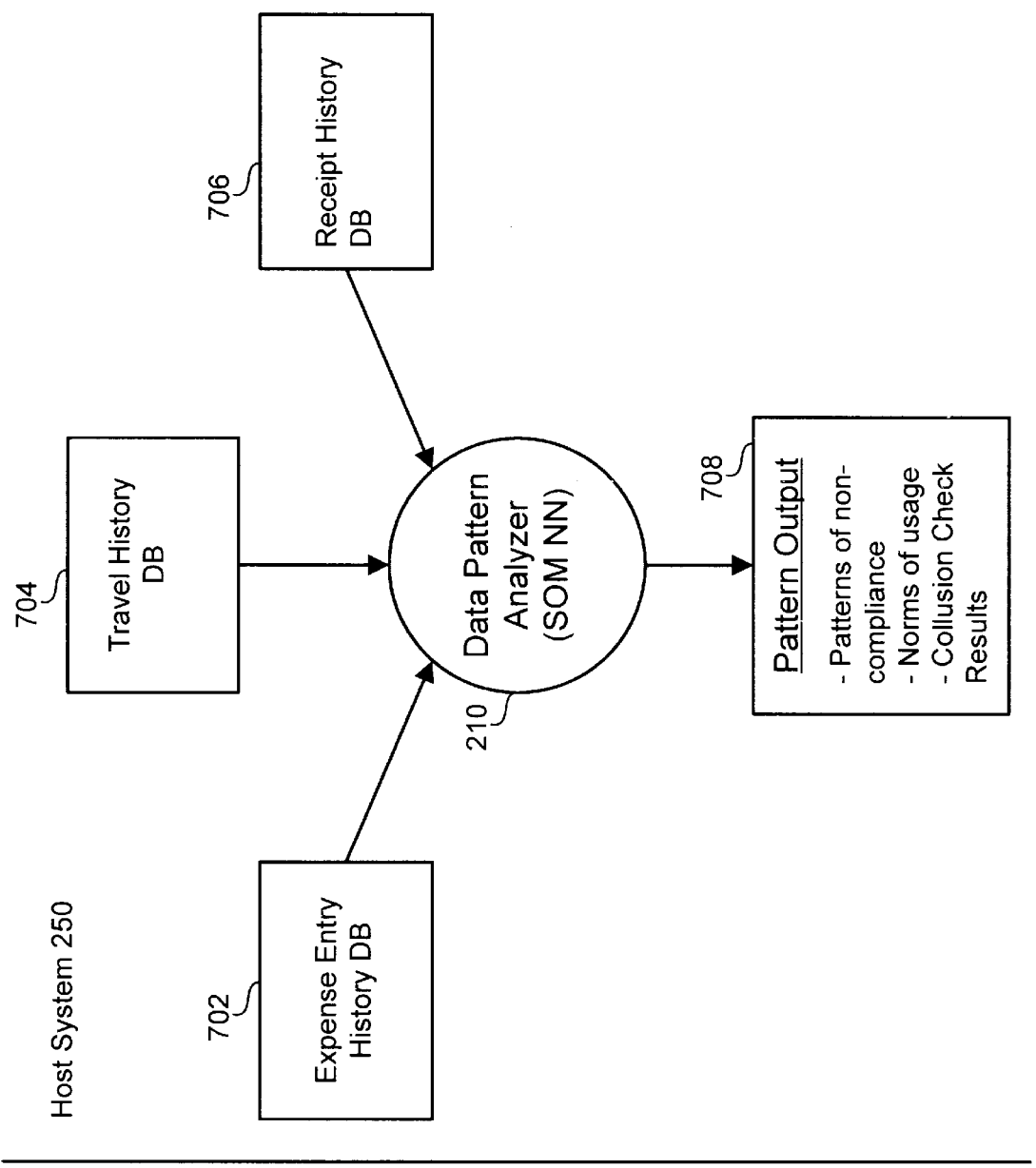
FIG. 7 is a data flow diagram of a data pattern analyzer in accordance with the preferred embodiment.

The preferred embodiment also includes a data pattern analyzer that locates patterns of expense usage that can be an indicator of fraud. Turning to FIG. 7, Data pattern analyzer 210 receives data from the audits performed by policy checker 208 and auditor system 256 that is stored in an expense entry history database 702. Additionally, data pattern analyzer uses historical data for individuals, departments and organizations, located in travel history database 704 and receipt history database 706. Data pattern analyzer 210 outputs a pattern output 708, which preferably includes a patterns of non-compliance table, a norms of usage table, and a collusion check results table.

In the preferred embodiment, data pattern analyzer 210 preferably comprises a Self Organizing Map (SOM) Neural Network, and in particular, a Kohonen network. Data pattern analyzer 210 can also include traditional programs to perform some types of pattern checking.

A neural network is a kind of data processing system that is not explicitly programmed knowledge; instead, a network is trained through exposure to real-time or historical data. Neural networks are characterized by powerful pattern-matching and predictive capabilities in which input variables interact heavily. They can also adapt to changes in input information, and are considered a useful technology for nonlinear, complex problems.

Kohonen networks are a type of neural network that are self organizing, meaning that they have the ability to learn without being given the correct answer for an input pattern.

These systems are generally modeled after neurobiological systems. Kohonen networks generally comprise a single layer of neurons that are highly interconnected to each other. Inputs to the Kohonen network are received into each neuron, but only the neurons closest to input generate an output signal. The neurons closest to the input can then adjust their weights to be closer to the input using the Kohonen learning rule. By repeating this process with many different inputs, the neurons in the Kohonen network will be manipulated to model the probability distribution function of the inputs. Kohonen networks can perform this statistical modeling even when no closed-form analytic expression can describe the distribution. Thus, the Kohonen network has the ability to model the distribution of inputs without requiring outside tutoring.

Figure 8:
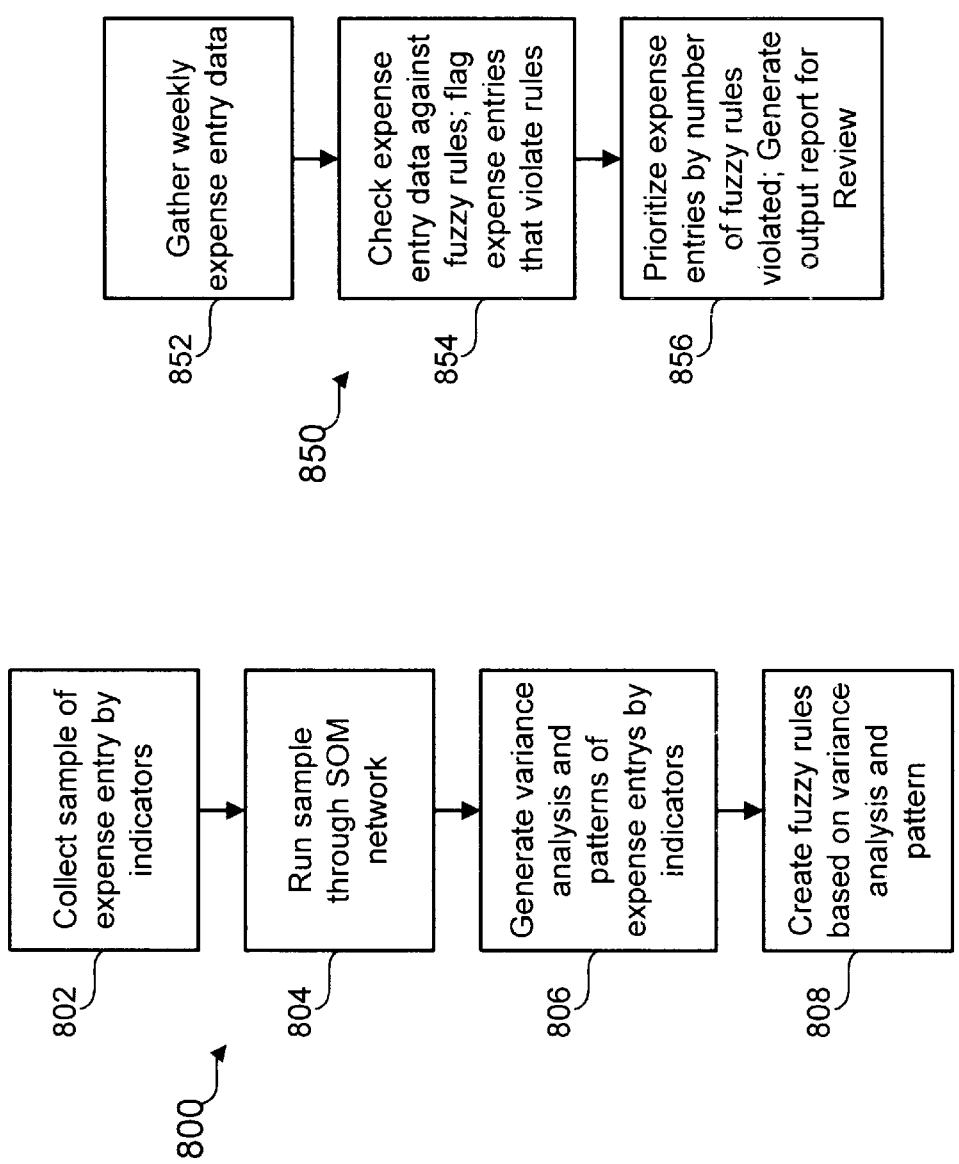
FIG. 8 is a flow diagram of a data pattern analyzer in accordance with the preferred embodiment.

Turning to FIG. 8, the preferred method 800 for training data pattern analyzer 210 is illustrated. The training involves selecting a sample of expense entry data and determining the statistical distributions of the data. The computed statistical distribution will then be used to make rules against which later expense entries can be checked.

Data pattern analyzer 210 is preferably trained to find patterns in expense account claims. For example, data pattern analyzer 210 can be trained to determine when there is an unusual high dollar and/or high volume of expense entries. As another example, data pattern analyzer 210 can be trained to find incidents of collusion and patterns of employee, manager and department spending.

Data pattern analyzer 210 can also be trained to determine average usage for employees, departments and organizations. This can be used to locate employees, departments and organizations that consistently exceed norms. For example, data pattern analyzer 210 can be trained to locate: average charge card use per trip; average cash advance per trip; average charge card use per travel amount; average cash advance per trip amount; average retail use per card with travel history; average retail use per card with no travel history; number of times an employee, department, or organization has gone outside the standard rates for meals, hotels, airfare, car or charge card; patterns of large volume small dollar expense entry claims; and patterns or incorrect code charges.

The preferred procedure for training the preferred embodiment data pattern analyzer 210 uses SOM neural network training. In the preferred embodiment, Neural Works Professional II software produced by NeuralWare, Inc. is used to construct, train and segment the expense entry data. In step 802, a sample of expense entries is obtained to use for training. The selected expense entries will be used as a representative set of historical data for training the neural network. The data used may have certain subsets (e.g., air travel) or period (e.g., spring) to insure it meets certain modeling requirements. In all cases the number of expense entry claims should be large enough to exhibit all aspects of the data distribution. Expenses that usually recur on a daily basis are converted into average daily expenses.

Each expense entry preferably includes the following data fields: average daily expense; amount due employee; spouse expenses; side trip amount, credit card charge amount, the sum of air expense, hotel expense, and charge card amount, the air amount, the hotel amount, the car amount, the average daily car amount, the average daily meals amount, the average daily tolls amount, the average daily miles amount, the average daily telephone amount; the business meals amount, the business entertainment amount, the other amount, the number of trip days, whether or not the trip was out of range; whether or not the division controller approved, what class the employee flew, whether the travel management system was used; whether the low cost fare was used, and whether the credit card division controller approved. Of course, other fields may be provided as needed.

The next step 804 is to run the selected sample of expense entries through the SOM neural network. As discussed above, this action groups the data into groups or clusters, with each group having like data field patterns (i.e., like average daily expenses, like amount due employee, like credit card usage, etc.). In the preferred embodiment, the expense entries are grouped into 64 groups having like data patterns.

The next step 806 is to generate a variance analysis and locate patterns for each group of expense entries. Each group is taken and analyzed to determine how the variances and ranges run for within the group. In particular, the data in each group of expense entries is analyzed to determine the standard deviations for various of the data fields. For example, the standard deviation for average daily expenses, amount due employee, spouse expenses; etc., for each group of expense entries is computed. This allows unusual expenditures to be discovered by computing the standard deviations from the mean and focus on those expense entries at the extreme high end of the distribution (i.e., a large expense amounts or high frequency of rule violations) This allows auditors to locate those who violate rules in ways that are different from the norm.

Each group is evaluated and the fields extracted from the group that are important in evaluating whether the cluster is good or bad. A group is determined to be good or bad by looking at the expense entry information that comprises each group on the cluster and looking for similarities that exist in each cluster. The expense entries that are put in each group by the neural net are analyzed to determine why they are similar to others in that group. Groups that contain large number of expense entries that have high expenses along with a number of policy violations are considered bad groups. These bad clusters can then be used to generate rules for locating the possibility of fraud.

Thus, the next step 808 is to extract fraud detecting rules from statistical distribution of the groups that will be used to locate expense entries in which a high probability of fraud exists. By using the statistical distribution to determine fraud detecting rules, the SOM neural network will not need to be used to perform the weekly fraud detection checking. Instead the rules are created from the historical data. Because the new expense entry data should follow the same statistical patterns as those used to create the rules (with some seasonal variation that can be accounted for), the rules should be able to recognize patterns in the new expense entry data that are indicators to fraud. The fraud detecting rules are preferably fuzzy rules, meaning that they are not absolute, but will flag expense entries that resemble those that are likely to contain fraud.

The fraud rules are preferably determined by the following cluster reduction process. First, expense entry fields with expense amounts greater then six deviations from the norm are selected. Each field that is greater than six standard deviations from the norm is then sorted, and the 10 highest from each sort selected. This generates groups of expense entries that are the farthest from the norm for each field. Expense entries that are common to all groups are located, and those that are common to all but one group, all but two groups, etc. The fields in the expense entries groups that are not six standard deviations from the mean are then removed. Each of these reduced groups are then analyzed for rule formation.

This is done by examining the groups for characteristics, such as other similarities, that can be detected now that some of the smaller standard deviation data is removed. For example, assume that five expense entries which all contain a air ticket are in a one group, as illustrated in table 1. Assume also that the analysis used above determines that this is a "bad group" from which a rule can be derived.

TABLE 1

| Expense Item | Cost  | Trip Duration | Agency Used? | Receipt? |
|---|---|---|---|---|
| Air Ticket 1 | $1000 | 5 days | Yes | Yes |
| Air Ticket 2 | $2000 | 9 days | Yes | No |
| Air Ticket 3 | $200  | 1 day  | No  | Yes |
| Air Ticket 4 | $300  | 1 day  | No  | Yes |
| Air Ticket 5 | $6000 | 5 days | No  | Yes |

When this group is examined it is noted that the cost for air ticket 1 and air ticket 2 are very close to the norm for air tickets, while the others are not. Thus, following the cluster reduction process removes these items from the group. The remaining reduced group is illustrated in Table 2.

TABLE 2

| Expense Item | Cost  | Trip Duration | Agency Used? | Receipt? |
|---|---|---|---|---|
| Air Ticket 1 | $1000 | 5 days | Yes | Yes |
| Air Ticket 2 | $2000 | 9 days | Yes | No |
| Air Ticket 5 | $6000 | 5 days | No  | Yes |

The remaining items in the reduced group can then be used to create a fraud detection rule. From the example group a rule such as "if the cost is over X standard deviations from the norm and the duration is 'around' 5 days or more, then the expense entry item might need further examination.

Thus, the rules are developed in a heuristic fashion. The distribution of the expense entry data is determined by the data pattern analyzer, that distribution is examined and used by fraud detection experts to generate fraud detection rules. The fraud detection experts know from experience which types of variations in which data fields are most likely to indicate a possibility of fraud. For example, fraud detection experts have found when the amount due an employee and the OTHER expenses are high, but the charge card amount is less then average. Using this knowledge along with the statistical distributions generated by the SOM, a set of fraud detection rules can be created.

These rules may need to be modified if employee behavior changes. For example, if new rules compel more company credit card usage from employees, the SOM will need to be retrained and the relevant rules modified to reflect this change in behavior.

With the data pattern analyzer SOM neural network trained, the created fraud detecting rules can be used detect expense entries that follow patterns indicative of fraud. In the preferred embodiments, the expense entries are gathered weekly and run against the fraud detecting rules by the data pattern analyzer. Turning to FIG. 8, a flow diagram 850 illustrating the fraud detecting processing of the data pattern analyzer 210 is shown. The first step 852 is for the data pattern analyzer to collect processed expense entry claims from the expense entry system for the previous week and format them for testing against the rule. The next step 854 is for the Data pattern analyzer 210 to check each expense entry against all the pattern rules that are designed to detect the possibility of fraud. When an expense entry fails a rule it is flagged. In step 858 the flagged expenses are then prioritized by the amount of fraud detecting rules were violated. Thus, expense entries that violate a large number of the fraud detecting rules are at the top the list. The expense entries that violate the rules are then sent and are determined to contain possible fraud are written to a data pattern analyzer 210 output file.

In the preferred embodiment data pattern analyzer 210 also runs a weekly check to determine if accumulated expense entries by serial number exceed a threshold value greater than the sum of all fraud possibility codes. Thus, the number of fraud-indicative items in an expense entry are added togther. If the number is greater than a predetermined threshold value, the employee serial number along with a set of expense entry keys are sent to administration system 258 for further investigation. This will generally occur when an employee repeatedly violates the pattern detection rules.

Figure 9:
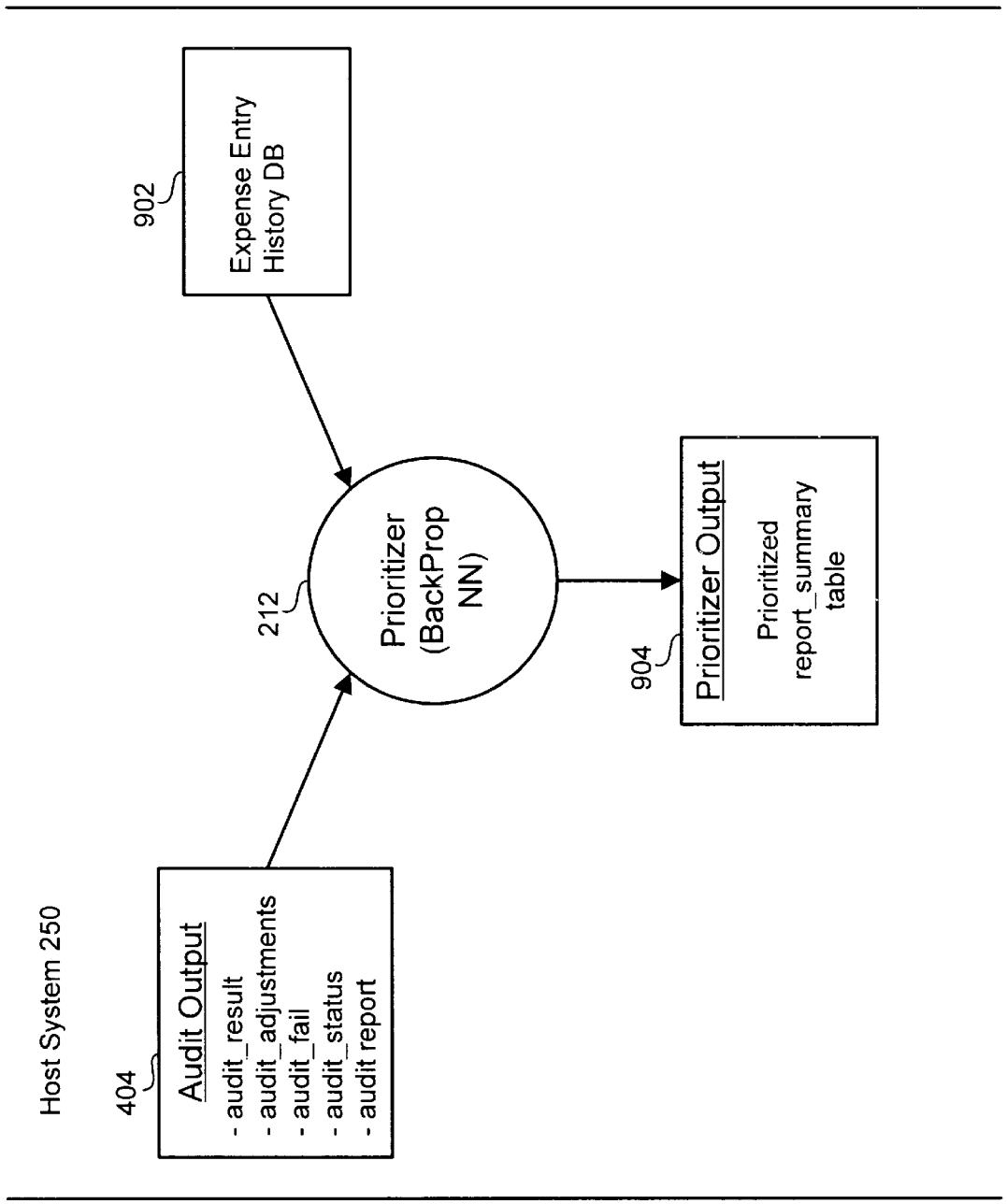
FIG. 9 is a data flow diagram of a prioritizer in accordance with the preferred embodiment.

The preferred embodiment of the present invention also includes a prioritizer 212 which ranks detected rule violations for reporting to management. Turning now to FIG. 9, a process flow diagram for prioritizer 212 is illustrated. The prioritizer 212 receives the previously run audit results from the audit output 404 and an expense entry history database 902. The expense entry history database preferably includes a history of the past results of running the expense entries through the policy checker 408, and the past results of the prioritizer 212. Prioritizer 212 outputs a report with violations prioritized by severity.

In the preferred embodiment, the prioritizer 212 comprises multiple backpropagation neural networks (backprop NN) designed to rank by severity the various expense entries. Backpropagation neural nets are typically three layer networks that contain an input layer, an output layer, and a hidden layer. These neural nets are trained providing an input with a known desired output. The resulting output is then compared to the desired output, with any difference propagated back to the neurons of the previous layers, where the difference is used to modify the weights of the various neurons to more closely match the desired output. By repeatedly doing this the backprop NN is trained to provide the correct output to a particular input. Then, when later unknown inputs are applied, the correct output will be generated.

In the preferred embodiment, the backprop NNs of prioritizer 212 are designed to generate a severity ranking for patterns of exceptions to policy detected by policy checker 208 and notify the appropriate management through the administration system 258. The prioritizer 208 receives input from the previous auditing by the policy checker 208 and data pattern analyzer 212 and creates a file containing recent expense entries called report_summary. All the expense entries in the report_summary file are then examined and classified by severity by the prioritizer 212. The prioritizer then outputs a prioritized report_summary table 904, which lists the expense entries and users that have violated rules beyond certain predetermined break points.

Figure 10:
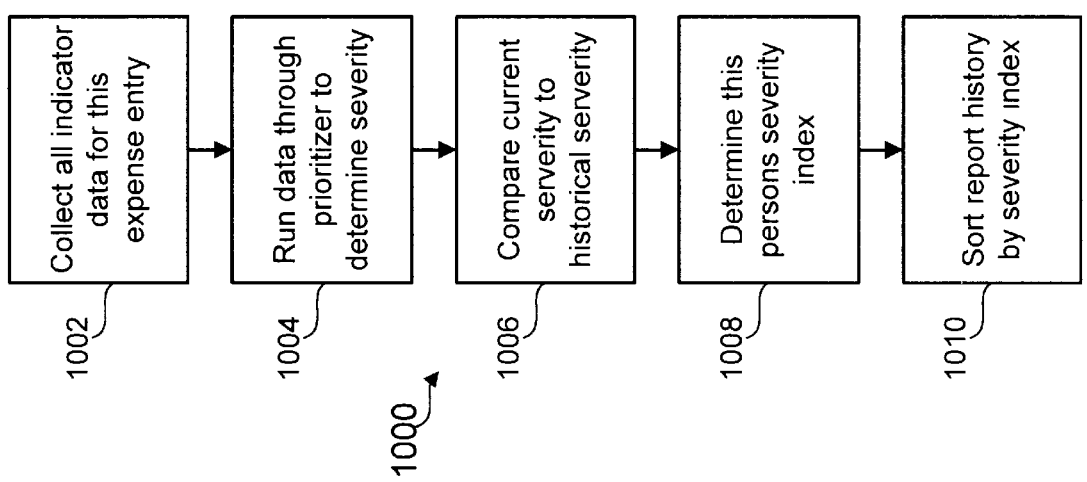
FIG. 10 is a flow diagram of the prioritizer in accordance with the preferred embodiment.

Turning to FIG. 10, a flow diagram illustrating a method 900 for prioritizing expense entry violations is shown. The first step 1002 is to select an expense entry for analysis and to collect all the indicator data for this expense entry. The indicator data is stored in the expense entry history database 902 and would typically identify items that are indicators of fraud, such as not using proper travel management systems, expenses over limits, not using the proper corporate charge card, etc. In the preferred embodiment, the indicators are put into groups of like indicators and processed by separate backprop NN. This results in a severity ranking for each group, which can then be added together to create a total severity ranking.

The preferred indicators are grouped together with like indicators, for example, a non-usage indicator group which looks at improper expense usage includes the following indicators: proper travel management not used; low cost air not used; not approved class used; non-use of corporate charge card. The indicators in this group would be analyzed using a backprop NN designed to evaluate this group. Another preferred group is a mistake group which looks at errors in the expense entries, and includes: travel management system said used but not; lowest fare said used but not. Again, a the indicators in this group would be analyzed using a backprop NN designed to evaluate this group. A listing of the preferred indicators in each group, with the preferred rankings and method for determining the severity when multiple indicators are found in a group is shown in appendix 2.

Likewise, a keyword group that looks for keywords that are sometimes indicative of fraud includes: not on auditor list but said international auditor; business purpose not valid; business purpose has international assignment keywords; trade show keywords; dues keywords. A car group that looks for possible fraud with regard to car expenses includes: total mileage on personal car greater than total miles maximum; miles rental car fraud scenario (where an employee rents a car at a relatively low rate, but then claims to have driven his/her own car and requests per-mile reimbursement, which in many cases can be significantly higher); no rental car but gas expensed; mileage is greater than a high mileage value; mileage and car rental claimed within 5% of each other; rental car above midsized; refueling charges. An expense group that looks for problems in expense amounts includes; spouse expenses on expense accounts; duplicate expenses; weekend expenses included on expense entry; duplicate expenses with supplemental and regular serial numbers; no receipt. An outside of range group that looks for problems in expense amounts includes; exchange rate out of range, hotel dates incorrect; hotel expense greater than hotel limit; laundry not authorized; over meal limit.

The next step 1004 is to run the expense entry indicator data through the prioritizer 212 backprop NN. This generates a severity ranking for the rules broken by this expense entry. This severity ranking assigned by the backprop NN is designed to be indicative of the likelihood of fraud. The backprop NN is designed to rank the expense entries in order of their likelihood of containing fraud. For example, previous experience has shown that expense entries where both the travel management system and the corporate charge card were not used have a much greater likelihood of containing fraud then those that simply did not use the corporate charge card. The backprop NN is thus preferably designed to rank those expense entries that violate both rules much higher than one that violates only one of them. By adding up the severity ranking from each group of indicators, a total severity for this expense entry is obtained, as shown in appendix 2.

The next step 1006 is to compare the severity for this expense entry to the severity for his past expense entries. This comparison will be used to create a severity index for this person in step 1008. The severity index for a person looks at the pattern of severity of the employee that submitted this expense entry. For example, if this current severity is high, but the employee has no past history of high severities then it is assumed that this is a isolated occurrence and the severity index will be not be high. If, on the other hand, this expense entry has a high severity and the employee has a history of high severity, the expense entry will be highly ranked.

In the preferred embodiment the severity index is calculated by a weighted sum of the severity generated for each of different categories. For example, the car output group generates a severity. From expert opinions, it is known that this may be more important than if the business purpose was wrong. So the output of the car category is weighted more heavily than the business purpose output. In this way, all the outputs for each category are added together to generate a severity index.

The next step 1010 is to prioritize the report summary based on the severity index. The prioritized report_summary can then be sent to a report generator 218 on administration system 258, where it can be used by the auditors to determine what expense entries need to be closely looked at.

For example, if an employee has submitted an expense entry with a meal limit that exceeds the meal limit once or twice, a report will not be generated. If however, this employee consistently goes over or near the meal limit then a report will be created to notify the appropriate person. The system uses a plurality of prioritizer rules to determine which violations should result in reports.

Figure 11:
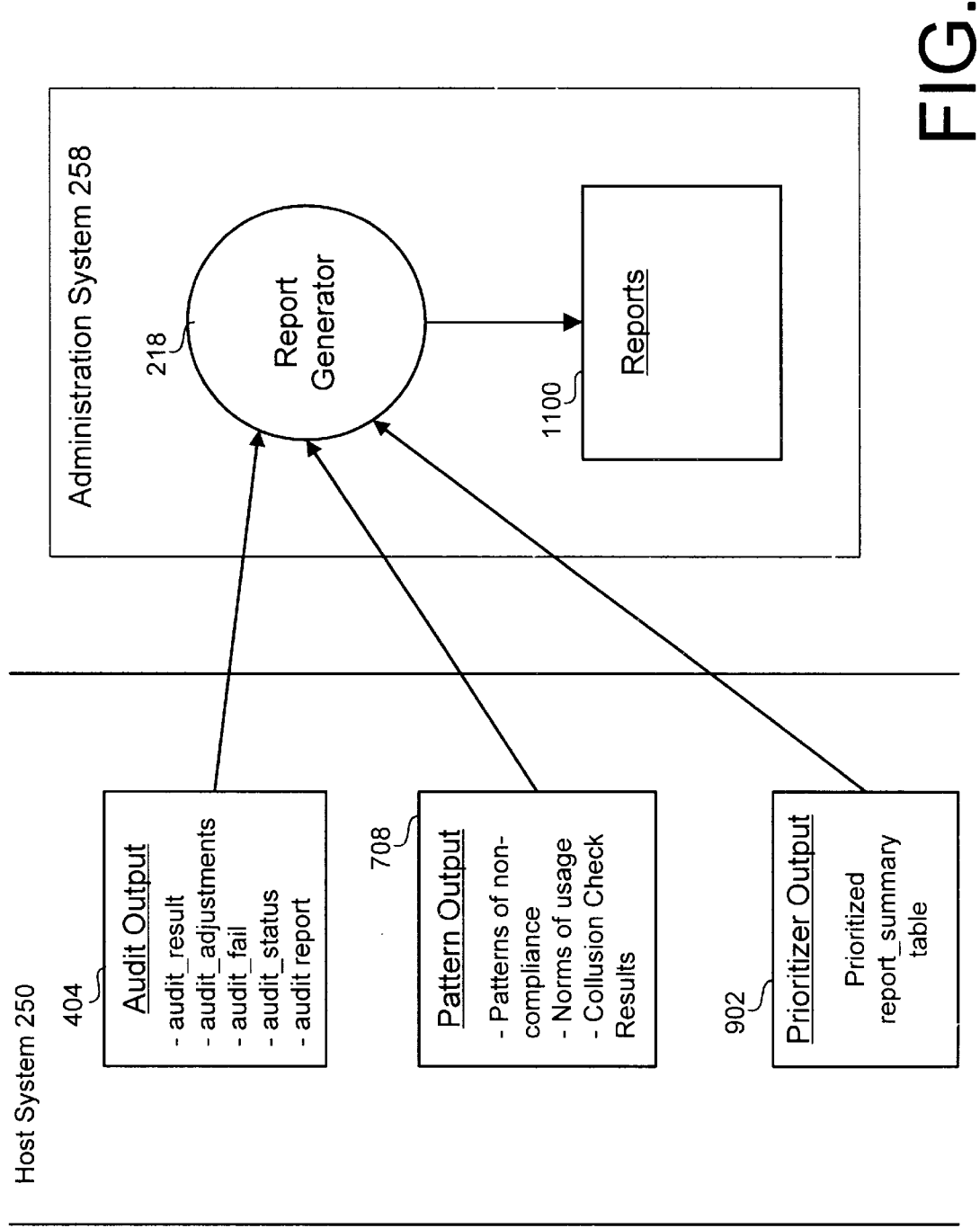
FIG. 11 is a data flow diagram of a administration system of the data pattern analyzer in accordance with the preferred embodiment.

Turning now to FIG. 11, the report generator 218 on the administration system 258 receives the outputs from the policy checker (audit output 404), the data pattern analyzer (pattern output 708) and the prioritizer (the prioritized report_summary table 902) and puts them in a form that can be used by management. This can involve the generation of any report which would be useful in evaluating the performance of the expense entry system.

In the preferred embodiment reports 1100 are generated that summarize the high offenders in each category as determined by the prioritizer 208. This report is sent to the appropriate business control manger who can then review the data in the report_summary table on this individual. For example, if an employee shows a problem with car rentals, the business control manger can check the other data in the report summary to see if there is other problems that may corroborate possible non-compliance.

While the invention has been particularly shown and described with reference to an exemplary embodiment, those skilled in the art will recognize that various changes in form and details may be made therein without departing from the spirit and scope of the invention.

What is claimed is:

1. An apparatus comprising:
   at least one processor;
   a memory coupled to the at least one processor;
   a computer program residing in the memory, said computer program including:
      a policy checker, said policy checker comparing an expense entry against at least one of a plurality of policy rules, said policy checker generating a recommendation for changing the expense entry to comply with the at least one of the plurality of policy rules, if the expense entry does not comply with the at least one of the plurality of policy rules; and
      an audit workflow program, wherein said policy checker sends the expense entry and the recommendation for changing the expense entry to said audit workflow program if the expense entry fails the at least one of the plurality of policy rules, and wherein said audit workflow program guides a manual audit of the expense entry.

2. The apparatus of claim 1 wherein said policy checker comprises a knowledge based expert system.

3. The apparatus of claim 1 wherein said plurality of policy rules comprise air travel rules, car expense rules and hotel rules.

4. The apparats of claim 1 wherein said audit workflow program guides a manual audit of the expense entry by guiding a human auditor to choose to accept, reject or modify the recommendation for changing the expense entry to comply with the at least one of the plurality of policy rules.

5. The apparatus of claim 1 wherein said plurality of policy rules are organized into a plurality of categories, each category comprising a plurality of high level rules, and wherein said policy checker checks said expense entry against at least one of said plurality of high level rules, sending said expense entry to an audit workflow program when said expense entry fails said at least one of said plurality of high level rules before checking said expense entry against other of said plurality of policy rules in the same category.

6. The apparatus of claim 5 wherein said expense entry is sent back to said policy checker after said expense entry is corrected by a manual audit.

7. The apparatus of claim 1 wherein s policy checker flags said expense entry when said policy checker detects spouse expenses for reimbursements that are taxable.

8. The apparatus of claim 1 further comprising a receipt database, wherein said plurality of policy rules include a check to determine if expense entry data is consistent with receipt data on the receipt database.

9. The apparatus of claim 1 wherein said plurality of policy rules include a check to determine if expense entry data is consistent with credit card data.

10. The apparatus of claim 1 wherein said plurality of policy rules include a check to determine if expense entry data is consistent with air ticket data.

11. The apparatus of claim 1 wherein said plurality of policy rules include a check to determine if expense entry data is consistent with car rental data.

12. The apparatus of claim 1 wherein said plurality of policy rules include a check to determine if a receipt has been submitted for said expense entry above a predetermined dollar amount.

13. A computer-implemented method for checking an expense entry for compliance with company policy, the method comprising the steps of:
 a) selecting from a plurality of rules at least one rule that said expense entry should be checked against;
 b) checking said expense entry against said at least one selected rule;
 c) recommending changes to put said expense entry in compliance with company policy if a violation of said at least one selected rule is found in said expense entry;
 d) passing said expense entry and said recommended changes to an auditor system for guiding a manual verification of said expense entry when a violation of said at least one selected rule is found.

14. The method of claim 13 wherein the step of checking said expense entry against said at least one selected rule comprises running said expense entry through a knowledge based expert system.

15. The method of claim 13 wherein the step of checking said expense entry against said at least one selected rule comprises checking said expense entry against at least one car rule when said expense entry includes car expenses.

16. The method of claim 13 wherein the step of checking said expense entry against said at least one selected rule comprises checking said expense entry against at least one hotel rule when said expense entry includes hotel expenses.

17. The method of claim 13 wherein the step of checking said expense entry against said at least one selected rule comprises checking said expense entry against at least one air travel rule when said expense entry includes air travel expenses.

18. The method of claim 13 wherein the step of checking said expense entry against said at least one selected rule comprises checking said expense entry against data from receipts submitted for said expense entry.

19. The method of claim 13 wherein the step of checking said expense entry against said at least one selected rule comprises checking said expense entry against credit card data from a supplying credit card company.

20. The method of claim 13 wherein the step of guiding a manual verification of said expense entry comprises the steps of:
 reviewing said recommended changes, and
 determining whether to accept, reject or modify said recommended changes.

21. The method of claim 20 wherein said at least one selected rule is a high level rule, and further comprising step of checking said expense entry against at least one lower level rule selected from the plurality of rules after determining whether to accept, reject or modify said recommended changes.

22. The method of claim 13 further comprising the step of comparing said expense entry with a group of related expense entries to detect any patterns of noncompliance that are indicative of fraud.

23. The method of claim 22 wherein the step of comparing said expense entry wtih a group of related expense entries to detect any patterns of noncompliance comprises analyzing said expense entry and said group of related expense entries against a plurality of pattern detecting rules, said pattern detecting rules generated from statistical distributions of past groups of related expense entries.

24. A program product comprising:
 (A) a computer program including:
  a policy checker, said policy checker comparing an expense entry against at least one of a plurality of policy rules, said policy checker generating a recommendation for changing the expense entry to comply with the at least one of the plurality of policy rules, if the expense entry does not comply with the at least one of the plurality of policy rules; and
  an audit workflow program, wherein said policy checker sends the expense entry and the recommendation for changing the expense entry to said audit workflow program if the expense entry fails the at least one of the plurality of policy rules, and wherein said audit workflow system guides a manual audit of said expense entry; and
 (B) computer-readable signal bearing media bearing said policy checker.

25. The program product of claim 24 wherein the computer-readable signal bearing media comprises recordable media.

26. The program product of claim 24 wherein the computer-readable signal bearing media comprises transmission media.

27. The program product of claim 24 wherein said policy checker comprises a knowledge based expert system.

28. The program product of claim 24 wherein said plurality of policy rules comprise air travel rules, car expense rules and hotel rules.

29. The program product of claim 24 wherein said plurality of policy rules are organized into a plurality of categories, each category comprising a plurality of high level rules and low level rules, and wherein said policy checker checks said expense entry against at least one of said plurality of high level rules, sending the expense entry to said audit workflow program when said expense entry fails one of said plurality of high level rules before checking said expense entry against at least one of said plurality of low level rules in the same category.

30. The program product of claim 24 wherein said policy checker flags said expense entry when said policy checker detects spouse expenses for reimbursements that are taxable.

31. The program product of claim 24 wherein said plurality of policy rules include a check to determine if expense entry data is consistent with receipt data on a receipt database.

32. The program product of claim 24 wherein said plurality of policy rules include a check to determine if expense entry data is consistent with credit card data.

33. The program product of claim 24 wherein said plurality of policy rules include a check to determine if expense entry data is consistent with air ticket data.

34. The program product of claim 24 wherein said plurality of policy rules include a check to determine if expense entry data is consistent with car rental data.

35. The program product of claim 24 wherein said plurality of policy rules include a check to determine if a receipt has been submitted for said expense entry above a predetermined dollar amount.

36. An apparatus comprising:
at least one processor;
a memory coupled to the at least one processor;
a policy checker residing in said memory, said policy checker including a knowledge based expert system to compare a plurality of expense entries against a plurality of policy rules, said policy checker providing a recommendation for correcting any of said plurality of expense entries that fail at least one of said plurality of policy rules, said recommendation comprising at least one correction that will put said any of said plurality of expense entries in compliance with company policy; and
an audit workflow program in memory, said audit workflow program receiving said any failing expense entries and said recommendation for correcting said any failing expense entries, wherein said audit workflow program directs a manual verification of said recommendation.

37. The apparatus of claim 36 wherein said plurality of policy rules comprise air travel rules, car expense rules and hotel rules.

38. The apparatus of claim 36 wherein said audit workflow program directs an auditor to accept, reject or modify the recommendation for correcting said any failing expense entries during a manual audit.

39. The apparatus of claim 36 wherein said plurality of policy rules comprise a plurality of high level rules and a plurality of low level rules, and wherein said plurality of expense entries are compared against at least one of said plurality of high level rules first, and wherein any of said plurality of expense entries are sent to said audit workflow system when a high level rule failure is determined, and wherein the plurality of expense entries are compared against at least one of the plurality of low level rules only after compliance with said at least one of said plurality of high level rules has been established.

40. The apparatus of claim 36 wherein said policy checker compares said plurality of expense entries that contain spouse expenses for reimbursements that are taxable.

41. The apparatus of claim 36 further including a receipt database, and wherein said plurality of policy rules include a check to determine if expense entry data is consistent with receipt data on said receipt database.

42. The apparatus of claim 36 wherein said plurality of policy rules include a check to determine if expense entry data is consistent with credit card data.

43. The apparatus of claim 36 wherein said plurality of policy rules include a check to determine if expense entry data is consistent with air ticket data.

44. The apparatus of claim 36 wherein said plurality of policy rules include a check to determine if expense entry data is consistent with car rental data.

45. The apparatus of claim 36 wherein said plurality of policy rules include a check to determine if a receipt has been submitted for expense entries above a predetermined dollar amount.

46. The apparatus of claim 36 further comprising a data pattern analyzer having a self organizing map neural network.

47. The apparatus of claim 36 further comprising a data pattern analyzer residing in said memory, said data pattern analyzer analyzing a selected group of the plurality of expense entries to detect any patterns of noncompliance by comparing said selected group of expense entries against a plurality of pattern detecting rules, said pattern detecting rules generated from statistical distributions of past selected groups of expense entries.

48. The apparatus of claim 36 further comprising a prioritizer program residing in said memory, said prioritizer program generating a prioritized list of any of said plurality of expense entries with violations ranked in order of their likelihood of containing fraud.

49. The apparatus of claim 48 wherein said prioritizer program comprises a plurality of backpropagation neural networks.

50. A computer-implemented method for checking a plurality of expense entries for compliance with company policy, the method comprising the steps of:
a) determining which rules selected from a plurality of rules said each of said plurality of expense entries should be checked against, such that any of said plurality of expense entries with car expenses are checked against car rules, any of said plurality of expense entries with hotel expenses are checked against hotel rules, and any of said plurality of expense entries with air travel expenses are checked against air travel rules;
b) checking each of said plurality of expense entries against said selected rules by running said each of said plurality of expense entries through a knowledge based expert system;
c) passing to an auditor system any of said plurality of expense entries that violate any of said selected rules, said passing including a recommendation for action to correct said any of said plurality of expense entries to put said any of said plurality of expense entries in compliance with company policy.

51. The method of claim 50 wherein the step of checking said plurality of expense entries against said selected rules further comprises checking each of said plurality of expense entries against data from receipts submitted for each of said plurality of expense entries.

52. The method of claim 50 wherein the step of checking said plurality of expense entries against said selected rules further comprises checking each of said expense entries against credit card data from a supplying credit card company.

53. The method of claim 50 further comprising the steps of reviewing said recommendation for action, and determining whether to accept, reject or modify said recommendation for action.

54. The method of claim 53 wherein further comprising step of checking said plurality of expense entries against selected lower level rules from the plurality of rules after determining whether to accept, reject or modify said recommendation for action.

55. The method of claim 50 further comprising the step of analyzing a group of expense entries in the plurality of expense entries to detect any patterns of noncompliance that are indicative of fraud.

56. The method of claim 55 wherein the step of analyzing a group of expense entries to detect any patterns of noncompliance comprises comparing said group of expense entries against a plurality of pattern detecting rules, said pattern detecting rules generated from statistical distributions of past groups of expense entries.

57. The method of claim 50 further comprising the step of generating a report, said report prioritizing violations of said selected rules according to the severity of the violations.

58. An apparatus comprising:

at least one processor;

a memory coupled to the at least one processor;

a policy checker residing in said memory, said policy checker including a knowledge based expert system to compare a plurality of expense entries against a plurality of policy rules, said policy checker providing a recommendation for action in regards to any of said plurality of expense entries that fail one or more of said plurality of policy rules;

an audit workflow program in said memory, said audit workflow program receiving any of said plurality of expense entries that have failed one or more of said plurality of policy rules and said recommendation for action, wherein said audit workflow program directs a manual verification of said recommendation for action;

a data pattern analyzer program in said memory, said data pattern analyzer program analyzing a group of expense entries within the plurality of expense entries to detect any patterns of noncompliance by comparing said group of expense entries against a plurality of pattern detecting rules, said pattern detecting rules generated from statistical distributions of past groups of expense entries, said data pattern analyzer including a self organizing map neural network; and a prioritizer program residing in said memory, said prioritizer program generating a prioritized list of expense entries with violations ranked in order of their likelihood of containing fraud, said prioritizer including at least one back propagation neural network.

* * * * *